United States Patent [19]

Auvoja

[11] Patent Number: 4,925,160
[45] Date of Patent: May 15, 1990

[54] FLOATING FRAME

[75] Inventor: Anders Auvoja, Hässleholm, Sweden

[73] Assignee: Dinol International Aktiebolag, Hassleholm, Sweden

[21] Appl. No.: 244,473

[22] Filed: Sep. 14, 1988

[30] Foreign Application Priority Data

Sep. 16, 1987 [SE] Sweden ............................... 8703579

[51] Int. Cl.$^5$ .............................................. B66F 7/26
[52] U.S. Cl. .................................................... 254/101
[58] Field of Search ............... 254/100, 101, 133, 134, 254/DIG. 4, 98

[56] References Cited

U.S. PATENT DOCUMENTS

| 2,730,327 | 1/1956 | Prough | 254/133 R |
| 3,799,197 | 3/1974 | Gibbons | 254/101 |
| 3,881,692 | 5/1975 | Clarke | 254/101 |
| 4,169,581 | 10/1979 | Thurmond | 254/101 |

FOREIGN PATENT DOCUMENTS 1013518  4/1952  France ............................... 254/101

Primary Examiner—Robert C. Watson
Attorney, Agent, or Firm—Burns, Doane, Swecker & Mathis

[57] ABSTRACT

A device for a floating frame that is to be used for assisting in work performed from the underside of an automobile includes a frame plate associated with the floating frame, a unit plate attached to the unit carrying the chassis/body and a ball roller positioned between the two plates. The ball roller is connected to the frame plate by way of an outer tube and the ball roller permits the floating frame to move side to side relative to the unit in a simple and easy manner.

4 Claims, 1 Drawing Sheet

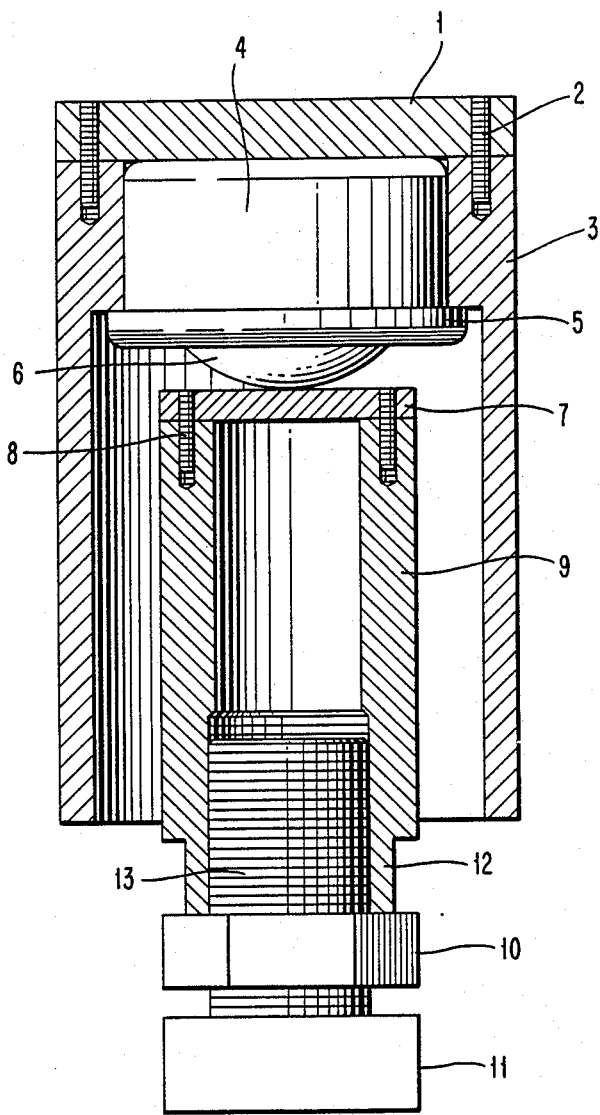

FLOATING FRAME

TECHNICAL FIELD

The present invention relates to a device for a floating frame that is intended to be used to facilitate work that is done from underneath a car chassis and car bodies and comprising a carrier that is to be positioned between said frame and the chassis/body.

The object of the present invention is to align a piece of working equipment and a car chassis/body to one another in a simple and rational way.

BACKGROUND OF THE INVENTION

While working on a car chassis and/or car body on a production line the chassis/body is brought forward on wagons on which the chassis/body rests via a pillar or the like. At different places along the production line work is performed underneath the chassis/body. Thus most of the modern car manufacturers today have a station where treatment of the underbody and the interior of different hollow spaces of the chassis and the body, such as beams and body holes is carried out using a rust protecting agent. The protective agent is applied through different premade openings in the chassis/body via different nozzles that are brought into the hollow spaces via said openings from a platform. The platform/frame which carries these nozzles or other spraying apparatuses must be aligned exactly with the chassis/body to allow the nozzles to align with and extend into those openings for which they are intended.

Prior to the present invention conical pins have been provided on the frame for insertion into holes intended therefore in the chassis/body. In that way, the chassis/body is positioned in place above the frame. The chassis/body is not always in the correct position on its pillars so an adjustment of a few centimeters in the horizontal plane, is therefor necessary. It has, however, been found that this adjustment requires a large force due to the weight of the chassis/body and the great friction present between the chassis/body and the pillars on the wagon travelling along the production line.

Thus, there exists a need for a more simple and efficient and less power requesting solution to the aforementioned problem.

SUMMARY OF THE PRESENT INVENTION

The inventor herein has discovered that the aforementioned problem can be overcome by means of the present invention which includes a frame plate that is arranged on the frame, a plate that is arranged on the unit carrying said chassis/body, and a ball roller is mounted between those plates. The ball roller is mounted to the frame plate by means of an outer tube, and the plate is attached to said unit, whereby the distance between said outer tube and said plate is the adjustable distance between said chassis/body and said frame.

BRIEF DESCRIPTION OF THE DRAWING

The invention will be described more in detail in the following with reference to the accompanying drawing which is a cross-sectional view of a preferred embodiment of the invention along a longitudinal axis.

DETAILED DESCRIPTION OF THE PREFERRED EMBODIMENT 1 denotes a circular frame plate, which is mounted to a cylindrical outer tube 3 by means of a screw arrangement 2. In the outer tube 3 a ball roller 4 is mounted close to the plate 1 so that the support 5 of the ball roller 4 is fixed in the outer tube 3 and so that the ball 6 of the ball roller 4 faces away from the frame plate 1. The ball 6 is movably arranged against a unit plate 7. The plate 7 is mounted to a cylindrical level adjustment means 9 by way of a screw arrangement 8. The adjustment means 9 includes a cylindrical part 12 and an inner screw 13. The inner screw 13 works in cooperation with threads arranged in the cylindrical part 12, and the level adjustment means 9 is fixed to a working platform, now shown, via a locking nut 10 and an attachment 11.

A working platform such as a jig for rust protection treatment includes a fixedly arranged construction that includes transporting means for transporting the wagon on which the chassis/body is travelling along a production line as well as a spraying equipment carrier that is movable up and down. In the present case four units in accordance with the above-description are placed in each corner of the arrangement in the connection between the fixedly arranged construction and the spraying equipment carrier. When a body on its production line wagon reaches the platform it is brought in above the fixedly arranged construction and above the spraying equipment carrier. The chassis/body is now usually somewhat out of position in order to be reached by the sprayers of the carrier, i.e. those openings/holes which shall receive the rust protecting agent are somewhat out of position. When the carrier is brought into working position one or more of its conical guiding pins will first meet the chassis/body on its underside and be brought into the chassis/body and places the carrier right in relation to the said openings/holes by means of a rotation in the horizontal plane, whereby a minimal force need to be applied to "rotate in" the jig due to the ball roller construction arranged. The distance between the outer tube 3 and the level adjustment means 9 is hereby the adjustable distance which corresponds quite well to the normally occurring variations of the placement sideways and lengthways of the chassis/body placed on a production line.

In order to adjust the unit with regard to different models and thereby different free wheeling the level adjustment means 9 can be moved upwards or downwards in the vertical plane and be locked by the locking nut 10 in the intended place.

The plate 7 can also be made somewhat concave in order to center the carrier after each spraying. The concavity, however, means that a somewhat greater force need to be applied to move the carrier in relation to the fixedly arranged stand/construction.

It has been shown in practical tests that the present invention solves the previously noted problems in a simple and rational way.

It shall be understood that the unit need not be cylindrically shaped, even if this from mere technical, mechanical reasons is to be preferred, but can take any other suitable sectional form, such as quadratic or rectangular, or any other shape which can be dependent on those chassis/bodies to be treated.

The principles, preferred embodiments and modes of operation of the present invention have been described in the foregoing specification. However, the invention which is intended to be protected is not to be construed as limited to the particular embodiment disclosed. Further, the embodiment described herein is to be regarded as illustrative rather than restrictive. Variations and changes may be made by others without departing from the spirit of the present invention. Accordingly, it is expressly intended that all such variations and changes which fall within the spirit and scope of the present invention as defined in the claims, be embraced thereby.

I claim:

1. A device in a floating frame for facilitating work on an underside of a car chassis comprising:
   a frame plate;
   an outer tube connected to the frame plate;
   a unit plate attached to a unit carrying said chassis, said unit plate having a substantially flat surface;
   a ball roller attached to the frame plate by way of the outer tube, said ball roller being positioned between the frame plate and the unit plate and being in contact with the substantially flat surface of the unit plate to allow the ball roller to roll along the substantially flat surface and thereby permit the floating frame to move sideways relative to the unit carrying the chassis, whereby the distance between said outer tube and said unit plate defines the adjustable distance between said chassis and said floating frame.

2. The device according to claim 1, wherein said unit plate is connected to a level adjustment means for adjusting the position of the unit plate, the ball roller, the outer tube and the frame plate in an axial direction.

3. The device in accordance with claim 2, wherein said adjustment means includes an interiorly threaded cylindrically shaped element, said axial direction being parallel to the longitudinal axis of the cylindrically shaped element.

4. The device in accordance with claim 3, wherein said adjustment means further includes a screw having external threads that engage the internal threads on the interior of the cylindrically shaped element and wherein said device includes a locking nut for fixing the position of the adjustment means.

* * * * *